Sept. 15, 1936. G. S. AFFLECK 2,054,579
FLUID GAUGE
Filed Sept. 9, 1933
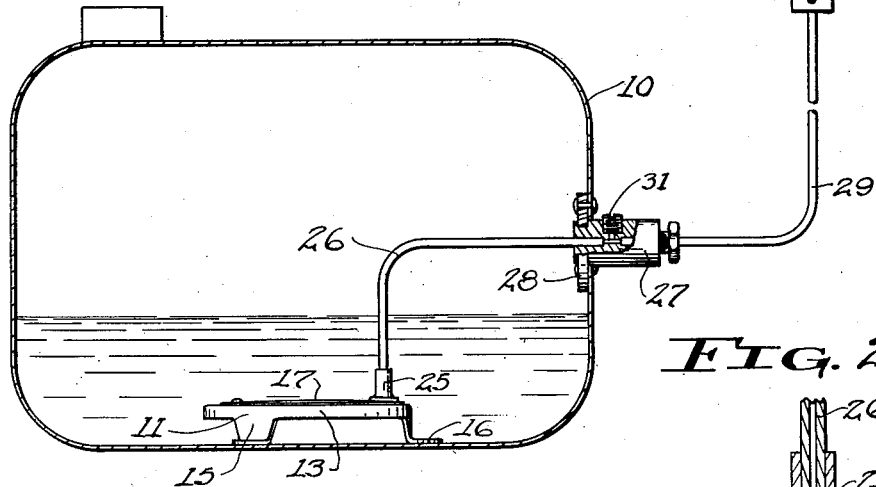
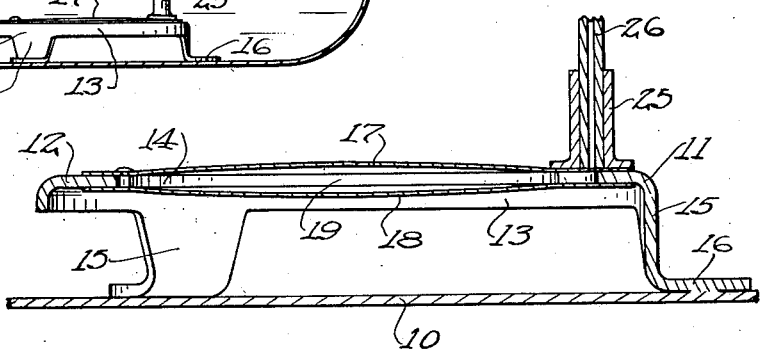
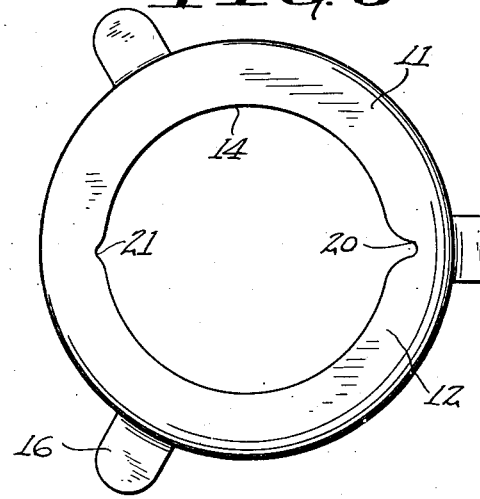
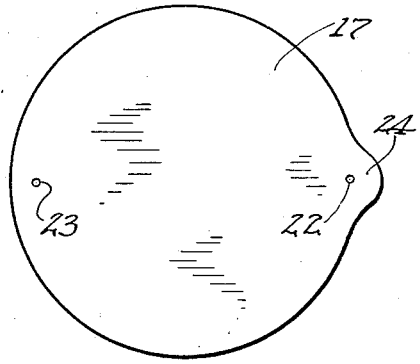
WITNESSES
INVENTOR
Gregor S. Affleck,
By R. S. Caldwell
ATTORNEY Patented Sept. 15, 1936

2,054,579

UNITED STATES PATENT OFFICE 2,054,579

FLUID GAUGE

Gregor S. Affleck, Detroit, Mich.

Application September 9, 1933, Serial No. 688,796

3 Claims. (Cl. 73—54)

The invention relates to fluid gauges of the type having a diaphragm chamber, the volume of which is varied by the hydrostatic pressure of a confined body of liquid thereabove, the diaphragm chamber being connected to a suitable indicator distant therefrom to gauge the volume of liquid in the body.

An object of the invention is to provide a simple and durable gauge of this type which can be inexpensively manufactured and in which compensation for variations in temperature is effected by the parts forming the diaphragm chamber.

The invention further consists in the several features hereinafter described and claimed.

In the accompanying drawing,

Fig. 1 is an elevation of a gauge embodying the invention as it appears when mounted in a tank, parts being broken away and parts being shown in section;

Fig. 2 is a sectional elevation of the diaphragm chamber;

Fig. 3 is a top plan view of a frame or spider for the diaphragm chamber, and

Fig. 4 is a detail view of one of the diaphragm disks or plates.

In this drawing, 10 designates a liquid receptacle, such as the gasoline tank of a motor-driven vehicle. A frame or spider 11 of pressed sheet metal is mounted within the tank near the bottom thereof and has an annular body portion consisting of a flat top wall 12 with a depending marginal flange 13, there being a substantially circular opening 14 in the top wall. A plurality of spaced legs 15 form downward extensions of the flange 13 and have out-turned feet or lugs 16 which are spot-welded or otherwise secured to the bottom wall of the tank.

Diaphragm disks or plates 17 and 18 of thin flexible sheet metal are soldered to the upper and lower faces of the top wall 12 to form a shallow chamber 19 between them bounded at its periphery by the edge of the opening 14. The assembly or casing thus formed is placed in a suitable mold and subjected to pressure to slightly bulge or crown the disks 17 and 18 to a bowed shape, as seen in Fig. 2.

The opening 14 in the spider top wall includes diametrically opposite notches 20 and 21, and the upper diaphragm disk 17 is provided with small openings 22 and 23 to respectively register with these notches. The disk 17 has an extension or tab 24 at which the opening 22 is located. The disk 18 is similar to the disk 17 except that the openings 22 and 23 are omitted. The opening 23 is closed after the device is assembled, as hereinafter described.

A flanged nipple 25 is secured, as by solder, to the upper disk 17 in register with the opening 22, and has secured therein the lower end of a bent tube 26 of small internal diameter, the other end of which is secured in a nipple 27 passing through the side wall of the tank. The reduced inner end of the nipple 27 is upset and soldered over a flange 28 riveted and soldered to the tank. A tube 29 of small internal diameter connects the nipple 27 with a suitable indicator 30, here shown to be a glass tube forming an indicating column.

The diaphragm chamber 19 and connected tubes are filled with a suitable liquid, such as a light oil, through an opening in the nipple 27 subsequently closed by a screw 31. During filling the vent opening 23 in the upper diaphragm disk 17 is open, but after the filling operation it is covered by a drop of solder or otherwise closed.

The hydrostatic pressure of the liquid in the tank 10 acts to press the diaphragm disks 17 and 18 inwardly and force indicating liquid out of the diaphragm chamber into the indicator 30 by way of the connected tubing. The height of the liquid in the indicator is proportional to the height of the tank liquid above the diaphragm chamber, thereby making it possible to determine the volume of liquid in the tank.

It is necessary or desirable to have some means of compensating for the change in volume of the liquid in the diaphragm chamber and connected tubing over the original volume of the chamber and tubing with variations in temperature. This is accomplished by making the frame or spider 11 and diaphragm disks 17 and 18 of materials having different coefficients of thermal expansion. A steel spider and brass diaphragm disks will effect such compensation. The expansion of the brass diaphragm disks by an increase in temperature is greater than that of the steel spider, with the result that the disks increase their convexity and also the volume of the chamber between them. Compensation is thus effected without requiring additional parts.

What I claim as new and desire to secure by Letters Patent is:

1. A fluid gauge, comprising a support having an opening, a pair of plates marginally attached to opposite sides of said support to form a liquid chamber with said opening, at least one of said plates forming a diaphragm displaceable by external fluid pressure to vary the volume of said chamber, and indicating means including a tube secured to the outer face of one of said plates at the stationary attached portion thereof and communicating with said chamber, the periphery of said opening being notched to communicate with said tube.

2. A fluid gauge, comprising a support having an opening, a pair of diaphragms marginally secured on opposite sides of said support and forming a liquid chamber with said opening, said diaphragms being displaceable by external fluid pressure to vary the volume of said chamber, and indicating means responsive to changes in the volume of said chamber, said diaphragms having convex outer sides and having a greater temperature coefficient of expansion than said support to effect their expansion by increasing temperature to increase the volume of said chamber and thereby compensate for variations in temperature.

3. A fluid gauge, comprising a casing having a fluid chamber and including a support and a diaphragm secured thereto, said diaphragm forming a wall of said chamber and displaceable by external fluid pressure to vary the volume of said chamber, and indicating means responsive to changes in the volume of said chamber, said diaphragm and support having different coefficients of thermal expansion to vary the volume of said chamber and thereby compensate for variations in temperature.

GREGOR S. AFFLECK.